United States Patent [19]

Nickson

[11] Patent Number: 5,566,503
[45] Date of Patent: Oct. 22, 1996

[54] PLANT WATERING AID ENCLOSURE

[76] Inventor: Jack Nickson, Warren Down, Peasemore Newbury RG16 OJL, United Kingdom

[21] Appl. No.: 140,202
[22] PCT Filed: Apr. 27, 1992
[86] PCT No.: PCT/GB92/00775
  § 371 Date: Sep. 6, 1994
  § 102(e) Date: Sep. 6, 1994
[87] PCT Pub. No.: WO92/19096
  PCT Pub. Date: Nov. 12, 1992

[30] Foreign Application Priority Data

Apr. 25, 1991 [GB] United Kingdom .................. 9108864

[51] Int. Cl.⁶ .................................................. A01G 1/00
[52] U.S. Cl. ........................................ 47/33; 47/23; 47/30
[58] Field of Search ........................ 47/33, 300 T, 76 R, 47/78 F, 23, 24; 404/7; 52/102

[56] References Cited

U.S. PATENT DOCUMENTS 3,315,752 4/1967 Pasquini ....................................... 47/33
5,020,272 6/1991 Herrema et al. ............................. 47/33

FOREIGN PATENT DOCUMENTS

| 111444 | 6/1899 | German Dem. Rep. | 47/76 R |
| 65697 | 11/1969 | German Dem. Rep. | 47/23 |
| 914797 | 7/1954 | Germany | 47/24 |
| 2945292 | 5/1981 | Germany | 47/33 |
| 234732 | 2/1945 | Switzerland | 47/300 T |
| 336638 | 4/1959 | Switzerland | 47/24 |

Primary Examiner—Terry Lee Melius
Assistant Examiner—Joanne C. Downs
Attorney, Agent, or Firm—James B. Middleton

[57] ABSTRACT

A water-retaining enclosure is formed around a plant (10) by joining the ends (18) of a wall (12) of flexible, water-impervious material, so as to form a circle around the plant, the wall then being inserted into the ground with a desired height (16) of the wall projecting above the ground. The wall has projections (20, 30, 32, 40) at intervals on a first side (21) and recesses (22, 31, 42) on the other or second side (19) to engage at least some of said projections for sealingly securing opposite end portions of the wall together.

6 Claims, 1 Drawing Sheet

PLANT WATERING AID ENCLOSURE

This invention relates to plant watering aids, in particular with the object of providing a continuous supply of water to the roots of a plant.

It is known to enclose a plant so as to retain water around its roots: thus the document GB-A-1 604 846 discloses a ring in the form of a wall or panel planted in the ground around the plant such as to confine liquid or fertiliser within it, especially on sloping ground. The document U.S. Pat. No. 4,809,460 discloses a curved elongated member planted in the ground on the downhill side of a plant in sloping ground, so as to act as an earth-retaining wall or dam, retaining liquid on its uphill side.

In GB-A-1 604 846, the ring may consist of a single member bent into an approximate circle and having its vertical free ends curled in such a way that they can be interlocked to define a vertical aperture through which an anchor pin can be driven to retain the ring in place. Alternatively the ring may be built up from a number of flat panels, interlocked in the same way at their ends. The enclosing ring can thus be built up in a variety of sizes and shapes, but only by adding a plurality of additional components. Similarly, if an enclosure of a different size or shape is required in the arrangement disclosed in U.S. Pat. No. 4,809,460, the wall must be replaced by another. The disclosure of U.S. Pat. No. 4,809,460 is directed to a permanent planting enclosure not intended to be removed.

When watering plants (which term includes trees) in a garden where the plants may be of widely-varying sizes, with some plants in awkward positions and with possibly a relatively large number of plants requiring frequent and/or regular watering—especially during prolonged periods of dry weather—there is a need for the watering operation to take as little time as possible, while at the same time involving minimum wastage of water. In addition, water applied too hastily can tend to escape on the surface instead of penetrating to the roots.

It is therefore desirable to provide a moisture—retaining wall that can be placed around each plant in turn, quickly, easily and effectively, and then removed equally quickly and easily. The wall should in addition be capable of being easily adaptable to the shape and size appropriate to each individual plant or group of plants temporarily enclosed within it, and to the shape and size of the ground accessible around the plant or plants.

According to the invention, a plant watering aid comprising a wall of flexible water-impervious material, adapted to be formed into a continuous wall and to be then inserted in the ground around a plant to be watered, so as to define a water-retaining enclosure within it, is characterised in that the wall has projections at intervals on a first side and recesses on the other or second side to engage at least some of said projections, for sealingly securing opposite end portions of the wall together.

The device is arranged to be inserted in the ground so that it can be moved from plant to plant as required. The means for securing opposite end portions of the wall together give the required continuous wall with substantially no gap through which significant amounts of water might escape.

The enclosure within the wall is open at the top, so that the ground over the roots of the plant can be watered within the enclosure; it is however also open at the bottom within the ground, so that the water is only retained laterally. There is thus no danger of the roots of the plant becoming waterlogged.

The wall may be of a suitable tough, flexible plastics material, or of a metal such as aluminium or galvanized sheet steel. The design lends itself, particularly to extrusion processes, however, so extrudable plastics materials and aluminium are preferred for this reason.

Various embodiments of the invention will now be described, by way of example only, with reference to the accompanying drawings, in which.

Figure 1:
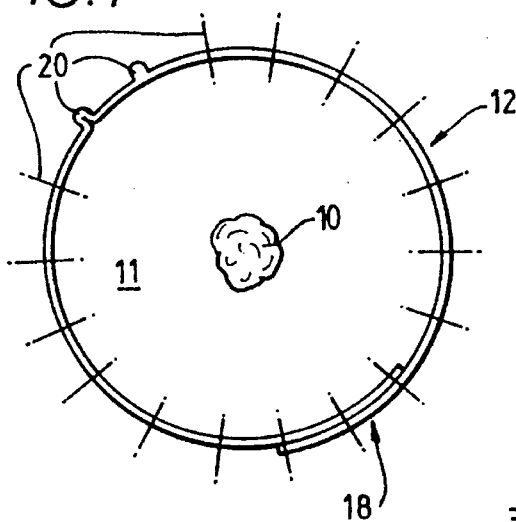
FIG. 1 is a plan view of a watering enclosure formed around a plant using a plant watering aid according to the invention.
Figure 2:
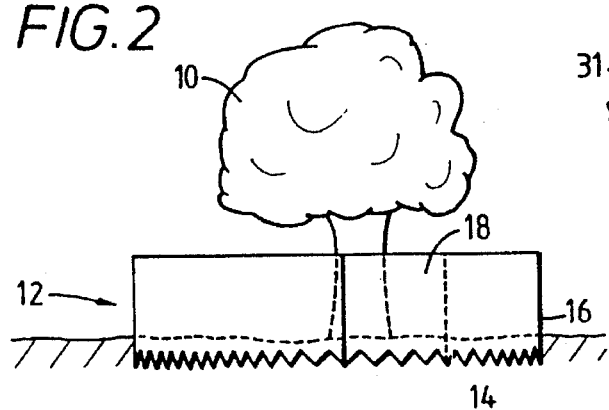
FIG. 2 is an elevation as seen from the bottom of FIG. 1.

In FIGS. 1 and 2, a plant 10, such as a shrub, a tree, or a bush, is planted in an area of ground indicated at 11. It will be understood that instead of a single plant, there may be a group of plants in the area 11.

For watering purposes, a substantially circular wall 12 is placed around the area 11 to form an enclosure. The wall 12 is constructed using the plant watering aid which consists of a generally flat, elongated wall section made from a flexible plastics material by extrusion. The wall 12 is inserted into the ground around the plant, and preferably has a serrated bottom edge 14 to facilitate this. It is inserted with an upper part 16 of the wall projecting above the ground. The two ends of the wall are overlapped as indicated at 18, and are preferably secured together so as to seal the joint. Thus the wall is erected by bringing it around the plant, overlapping its ends and securing them together where means are provided for doing so; it is then simply pushed into the ground, generally as seen in FIG. 2, just far enough to create a sealing effect such that no water can escape from within the enclosure 11 under the lower edge of the wall.

Figure 3:
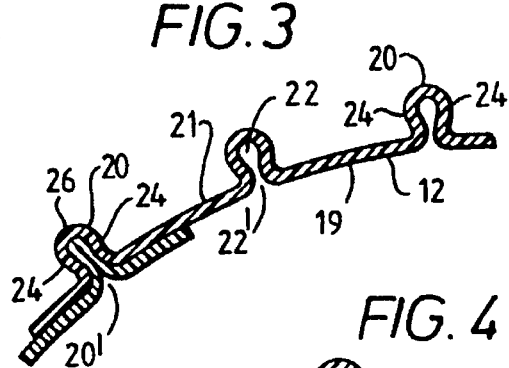
FIGS. 3 and 4 show, respectively, two typical cross sections of the wall which constitutes the plant watering aid; and, FIG. 5 is an elevation, on a larger scale, of a section of wall of the kind shown in FIG. 3.

In the wall section shown in FIGS. 3 and 6, a number of integral hollow projections 20 are formed at regular intervals along the length of the wall 12. Each hollow projection is open at the side 19 opposite the side 21 from which it projects, to provide a recess 22 having an open end 22'. These projections 20 are also indicated in FIG. 1, though it is to be understood that FIGS. 1 and 2 are not confined to the embodiment according to FIG. 3.

The two overlapped portions at 18 are secured together by pushing the projections 20 (one of which is indicated at 20' in FIG. 3) into the open end 22' of the recesses 22 of corresponding projections 20 on the outer wall section in the overlapped part. This is seen at the left hand side of FIG. 3, from which it can also be seen that each projection 20 has two side elements 24, joined by a curved outer element 26, and that these elements deform in such a way that the male projection 20' has its side elements 24 squeezed together, the elements 24 of the outer or female projection 20 being squeezed apart so that the combined resilience of the two projections 20 firmly secures both overlapped portions of the wall 12 together.

Figure 4:
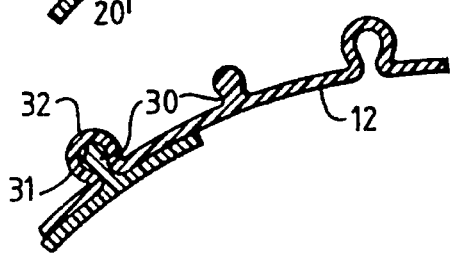

FIG. 4 shows an alternative arrangement in which the wall 12 is formed with alternate outward projections 30 and hollow outwardly projecting portions 32, the latter being generally the same as the projections 20 in FIG. 3. In this case the two overlapping parts of the wall are secured together by insertion of one or more of the projections 30 into the recess 31 in the projecting portions 32. It will be appreciated that the projections 20 in FIG. 4 also act as stiffening ribs.

Although the various projections 20, 30 and 32 are shown in the drawings as projecting from the outer face 21 of the wall, they may equally be directed inwardly instead, so that the face 19 becomes the outer face of the wall. In this respect the choice is of course made by the user when erecting the wall around a plant.

Figure 5:
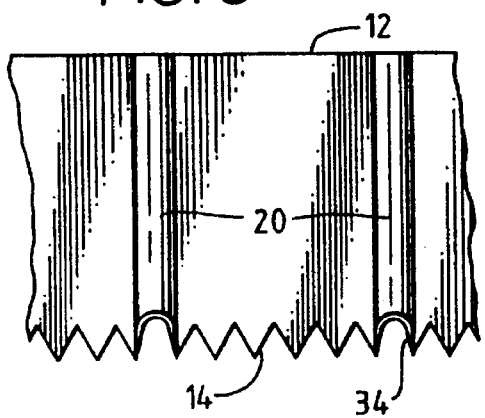

As indicated in FIG. 5, the projections 20 are vertical and extend the full height of the wall 12; the projections 30 and 32 in FIG. 4 also preferably extend vertically over its full height. The wall can then be made by extrusion, being cut into strips of the required width corresponding to the eventual total height of the wall 12. The serrated bottom edge 14 can then be formed by a suitable stamping operation, which is preferably carried out at an angle so as to give a chamfered bottom end (34, FIG. 5) to each projection 20.

Substantially all of the water in the enclosure within, the wall 12 will seep down to the roots of the plant, instead of escaping outwardly through the soil and away from the roots.

It will be understood that the various projections and recesses need not be vertical, or even straight; nor need they extend over the full height of the wall 12. Thus for example the projections on the first side 21 may be in the form of an array of pipes or studs engaging in recesses in the second side 19, and the latter may be formed in similar pipes or studs projecting on the first side, or in projecting elements separate from those capable of engaging in such recesses. Again, the projections and/or recesses may extend at a constant angle to the upper and/or lower edges of the wall 12, or at an angle that varies due to the projections and/or recesses being curved.

I claim:

1. A plant watering aid comprising an elongate wall of flexible water-impervious material having a first end and a second end, said elongate wall being adapted to be formed into a closed continuous wall with said first end overlapping said second end and fixed thereto, said closed continuous wall being inserted in the ground around a plant to be watered, thereby to define a water-retaining enclosure, said elongate wall including a plurality of vertically extending projections distributed at regular intervals along a first side of said elongate wall, a plurality of vertically extending recesses defined at regular intervals along the other or second side of said elongate wall, each recess of said plurality of recesses selectively resiliently receiving and gripping each of said projections, for sealingly securing said first end and said second end of said elongate wall together to form said closed wall.

2. A plant watering aid according to claim 1, wherein at least some of said recesses on said second side of said elongate wall are defined in said wall opposite said projections on said first side.

3. A plant watering aid according to claim 2, wherein each projection of said plurality of projections is formed as a sinuous flexible portion of said elongate wall and includes two side elements normally spaced apart but capable of being squeezed together for insertion in one of said recesses of a similar elongate wall portion.

4. A plant watering aid according to claim 1, said wall further including integral stiffening means.

5. A plant watering aid according to claim 1, wherein said plurality of projections comprises a first group of projections and a second group of projections, each projection of said first group of projections being adapted to be received within each recess of said plurality of recesses, projections of said second group of projections alternating on said first side of said elongate wall with projections of said first group of projections, said projections of said second group of projections defining said recesses therein on said second side of said elongate wall.

6. A plant watering aid comprising an upright flexible wall of water-impervious material, said flexible wall comprising a strip of said material having a first end and a second end, said first and second ends being overlapped and fixed together for forming a closed endless wall for insertion into the ground around a plant to be watered, thereby defining a water-retaining enclosure, a plurality of vertically extending projections spaced apart along one side of said flexible wall throughout the length of said strip, each projection of said plurality of projections being resiliently deformable and defining a vertically extending recess on the opposite side of said flexible wall, each projection of said plurality of projections on said first end being selectively received within one of said recesses on said second end, such each projection and said one of said recesses being deformed for resiliently retaining and gripping said projection within said recess.

* * * * *